(12) United States Patent
Masfarud et al.

(10) Patent No.: US 8,662,225 B2
(45) Date of Patent: Mar. 4, 2014

(54) BUILT-IN EQUIPMENT FOR MICRO-HYBRID DEVICE FOR AUTOMOTIVE VEHICLE AND MICRO-HYBRID DEVICE COMPRISING THE SAME

(75) Inventors: Julien Masfarud, Paris (FR); Hugues Doffin, Chatenay Malabry (FR); Farouk Boudjemai, Marcoussis (FR); Roger Abadia, Neuilly Plaisance (FR); Richard Tellier, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 1135 days.

(21) Appl. No.: 12/441,102

(22) PCT Filed: Aug. 16, 2007

(86) PCT No.: PCT/FR2007/051820
§ 371 (c)(1),
(2), (4) Date: Nov. 24, 2009

(87) PCT Pub. No.: WO2008/034986
PCT Pub. Date: Mar. 27, 2008

(65) Prior Publication Data
US 2010/0101877 A1    Apr. 29, 2010

(30) Foreign Application Priority Data
Sep. 22, 2006  (FR) ...................................... 06 53911

(51) Int. Cl.
*B60R 16/04* (2006.01)
(52) U.S. Cl.
USPC .............. 180/68.5; 903/907; 429/61; 429/62; 310/104; 320/116

(58) Field of Classification Search
USPC ................ 180/68.5; 429/61–62, 32, 72, 120; 903/907, 903, 904; 320/116; 310/104; 307/9.1, 10.1
See application file for complete search history.

(56) References Cited

U.S. PATENT DOCUMENTS

| | | | |
|---|---|---|---|
| 5,624,003 A * | 4/1997 | Matsuki et al. ............... | 180/65.1 |
| 5,713,426 A | 2/1998 | Okamura | |
| 7,172,831 B2 * | 2/2007 | Jaura et al. ...................... | 429/72 |
| 7,819,172 B2 * | 10/2010 | Otsuka et al. ................. | 165/80.3 |
| 8,134,343 B2 * | 3/2012 | Like et al. ...................... | 320/166 |
| 2005/0269988 A1 * | 12/2005 | Thrap ............................ | 320/116 |

FOREIGN PATENT DOCUMENTS

| | | |
|---|---|---|
| EP | 1 213 175 | 6/2002 |
| FR | 2 688 174 | 9/1993 |

* cited by examiner

*Primary Examiner* — John Walters
*Assistant Examiner* — James Triggs
(74) *Attorney, Agent, or Firm* — Berenato & White, LLC

(57) ABSTRACT

A built-in equipment for a micro-hybrid device for an automotive vehicle, and to a micro-hybrid device comprising the same. The built-in equipment for a micro-hybrid device for an automotive vehicle of the present invention can be electrically connected to operational components of the micro-hybrid device and comprises a pack of super-capacitors provided with voltage balancing means and electronic circuits. The equipment comprises a housing containing a first compartment for receiving the pack of super-capacitors, and a second for receiving the electronic circuits and the voltage balancing means.

19 Claims, 3 Drawing Sheets

BUILT-IN EQUIPMENT FOR MICRO-HYBRID DEVICE FOR AUTOMOTIVE VEHICLE AND MICRO-HYBRID DEVICE COMPRISING THE SAME

CROSS-REFERENCE TO RELATED APPLICATIONS AND CLAIM TO PRIORITY

This application relates to International Application No. PCT/FR2007/051820 filed Aug. 16, 2007 and French Patent Application No. 0653911 filed Sep. 22, 2006, of which the disclosures are incorporated herein by reference and to which priority is claimed.

The present invention is of advantageous application in the automobile sector. It relates to built-in equipment for a micro-hybrid device for an automotive vehicle in which a power store, an AC/DC converter and a DC/DC converter may be integrated in a single housing. Combining different electronic and electrotechnical components in a single housing as proposed by the invention is intended to reduce the bulk and cost and improve the reliability of the ensemble of such components in an automotive vehicle.

In order to reduce the consumption of fuel in automotive vehicles, and as a consequence the pollution they generate, equipping a vehicle with a micro-hybrid starter alternator device allowing regenerative braking is known.

In the prior art, a micro-hybrid device of the type described above is composed of mechanically independent electrical components. Generally, such components are a reversible rotary electric machine, a reversible AC/DC converter, a pack of super-capacitors and a reversible DC/DC voltage converter.

The micro-hybrid device is connected to the power battery of the electrical supply network of the vehicle through the DC/DC voltage converter.

The starter alternator acts as an alternator and as a starter for the heat engine.

In alternator mode, the shaft of the heat engine of the vehicle drives the rotor of the electric machine to produce an electric current in the stator and supply an on-board network of the automotive vehicle.

The architecture of the components of the above prior art micro-hybrid device suffers from disadvantages. The micro-hybrid device produced with mechanically independent components indeed requires that the latter be connected together via relatively long wiring. The length of the wires connecting the AC/DC converter to the rotary electric machine, to the DC/DC converter and to the pack of super-capacitors does not facilitate overcoming the thermal and electrical problems existing in the micro-hybrid device.

In a space as restricted as the engine compartment of an automotive vehicle, this type of architecture is difficult to incorporate into any type of vehicle, especially as some of the components, such as the super-capacitors, are relatively bulky. In addition, it requires relatively complex connections, which are not conducive to high reliability; the connections are complicated even further since the super-capacitors have to be equipped with voltage balancing means to achieve better reliability of the pack of super-capacitors and to balance the voltage at the terminals of each of the cells of the pack of super-capacitors.

In addition, the overall cost of this type of conventional prior art architecture is high.

The present invention overcomes these problems posed by the conventional architecture described above.

In a first aspect, the invention provides built-in equipment for a micro-hybrid device for an automotive vehicle, which can be electrically connected to operative components of the micro-hybrid device, comprising a pack of super-capacitors provided with voltage balancing means and electronic circuits.

In accordance with the invention, the equipment comprises a housing including a first compartment in which the pack of super-capacitors is housed and a second compartment in which the electronic circuits and the voltage balancing means are housed.

This novel architecture facilitates the integration of the micro-hybrid device into any type of automotive vehicle, reduces its cost and its bulk and improves reliability.

This novel architecture for a micro-hybrid device of the invention leads to a reduction in the dissipated electrical power as well as in the size and cost of such a system, while simplifying the integration of power management into other systems.

In addition, the invention implements effective thermal management because the dissipated power per unit surface area is extremely low.

Integrating the pack of super-capacitors and the AC/DC converter into the equipment of the invention means that ripples in the voltage from the AC/DC converter when the rotary electric machine functions in alternator mode can be reduced. It also means that certain standard tests of electromagnetic compatibility which are only required for separate components as used in the prior art can be dispensed with.

Integrating the pack of super-capacitors and the DC/DC converter into the equipment of the invention means that the voltage drop in the wires can be reduced. In fact, when a voltage drop occurs, the pack of super-capacitors discharges stored electrical power while the rotary electric machine functions in alternator mode.

In addition, the components associated with a micro-hybrid device dissipate part of the energy they transmit as heat, which generates localized heating in the components and the wiring. To overcome this problem, the invention employs a heat dissipater placed on the housing of the built-in equipment. It also proposes providing the built-in equipment with a cooling system to prevent breakdowns due to excessive temperatures in the components and wiring.

In accordance with complementary characteristics of the invention in its preferred embodiments, the components are disposed in the housing of the built-in equipment such that they increase the efficiency of heat dissipation and the cooling of the components and wiring.

The built-in equipment of the invention may advantageously have the physical size of a conventional storage battery. It may thus be placed in the location of the power battery, which in this case may be placed elsewhere in the automotive vehicle at thermally compatible locations such as the boot or under the driver's seat.

The invention may advantageously also have one or more of the following characteristics:
  the pack of super-capacitors comprises a plurality of super-capacitor cells and the voltage balancing means comprise a plurality of voltage balancing cells connected to the terminals of the plurality of super-capacitor cells;
  the voltage balancing cells each comprise voltage limiting means to limit a charging voltage of the respective super-capacitor cell to a predetermined value;
  the voltage limiting means are connected to the terminals of the respective super-capacitor cell;
  the cells of the super-capacitor are electrically mounted in series;
  the cells of the super-capacitor are elongate cells disposed parallel to each other;

the cells are orientated alternately in one direction then in the other to present opposite poles to one face of the housing;

the cells are elongate with their largest dimension orientated parallel to the plane of a wall separating the first and second compartments in the housing;

the electronic circuits comprise a DC/DC converter which can be connected to an electric power battery of an electrical distribution network of an automotive vehicle;

the electronic circuits comprise an electronic board for controlling the DC/DC converter;

the electronic circuits comprise an AC/DC converter which can be connected to a rotary electric machine of the micro-hybrid device;

the electronic circuits comprise an electronic board for controlling the AC/DC converter;

the first compartment and the second compartment are separated by a thermally insulating wall;

cooling means are provided for one and/or the other of the first and second compartments of the housing;

the cooling means comprise at least one fan coupled to a pipe ensuring forced circulation of a cooling fluid through the first compartment;

the cooling means comprise a heat dissipater increasing the surface area for heat exchange through the outer wall of the second compartment of the housing.

In accordance with a further aspect, the invention also concerns a micro-hybrid device for an automotive vehicle comprising a rotary electric machine which can be mechanically coupled to a heat engine of the vehicle and built-in equipment as briefly described above, the built-in equipment being electrically connectable, on the one hand, to the rotary electric machine and, on the other hand, to an electric power battery of the vehicle. Clearly, in accordance with the invention, the rotary electric machine may advantageously be a starter alternator.

The invention also concerns an automotive vehicle provided with a micro-hybrid device as briefly described above.

Other characteristics and advantages of the invention will become apparent from the following detailed description made with reference and for comprehension, to the accompanying drawings in which.

Figure 1:
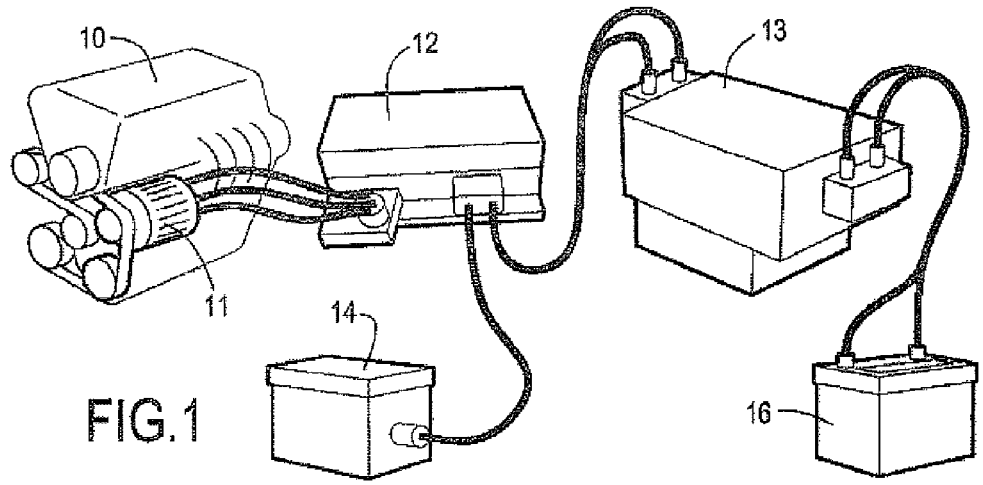
FIG. 1 is a diagrammatic illustration of architecture for a prior art starter alternator micro-hybrid device.

The current wiring architecture of the various components of a prior art starter alternator micro-hybrid device is bulky and expensive. One example of such architecture is shown in FIG. 1. In the example of FIG. 1, the starter alternator micro-hybrid device comprises a polyphased voltage AC/DC converter 12 electrically connected to a reversible rotary electric machine 11.

The (AC/DC) converter 12 is a reversible voltage converter.

When the rotary electric machine 11 functions in starter mode in order to start the heat engine 10 of the vehicle, the AC/DC converter 12 operates in a manner such that it converts a direct voltage deriving from power/energy storage means of the vehicle into polyphased voltages, more precisely three-phase voltages in the embodiment of FIG. 1. The polyphased voltages are used to drive the rotary electric machine 11.

When the rotary electric machine 11 functions in alternator mode, more precisely in normal alternator mode or in alternator mode with regenerative braking, the AC/DC converter 12 operates so as to convert the polyphased voltages supplied by the machine 11 into a direct voltage which is employed to supply the electrical distribution network of the vehicle and to charge the power/energy storage means thereof.

As can be seen in FIG. 1, the AC/DC converter 12 is conventionally connected to a pack of super-capacitors 14 constituting the power storage means.

The AC/DC converter 12 is also connected to a reversible DC/DC voltage converter 13. This DC/DC converter 13 is connected between the pack of super-capacitors 14 and the power battery 16. The DC/DC converter 13 allows bi-directional transfers of electrical energy between the pack of super-capacitors 14 and the power battery 16.

In vehicles provided with dual voltage electrical distribution networks, a high floating direct voltage network may be supplied from the voltage present at the terminals of the pack of super-capacitors 23. The energy supplied to this floating direct voltage network may then derive from the pack of super-capacitors 23, from the machine 21 operating as an alternator, through the AC/DC converter 22 or from the power battery 26 through the DC/DC converter 24 then operating as a voltage step-up device.

Figure 2:
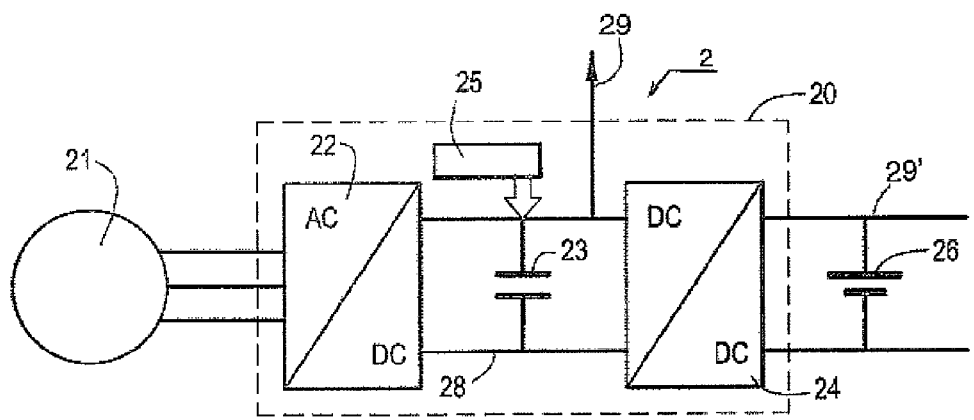
FIG. 2 illustrates the operative means implementing an embodiment of a micro-hybrid device in accordance with the invention.

FIG. 2 shows a diagrammatic representation of a starter alternator micro-hybrid device of the invention. The starter alternator micro-hybrid device of FIG. 2 comprises built-in equipment 2 of the invention, contained in a housing 20, which is interposed between a rotary electric machine 21 and a power battery 26. The reversible rotary electric machine 21 is typically a three-phase synchronous machine.

The notion of a "power battery 26" as used in the present invention is intended to encompass any device forming a rechargeable reservoir of electrical energy at the terminals of which a non-zero electrical voltage is available, at least in a non-zero charge state of the device. This battery 26 is supplied by the electric machine 21 via the built-in equipment 2. This battery 26 can supply electric or electronic consumers. Typical electric or electronic consumers in an automotive vehicle are the headlights, radio, air conditioning, windscreen wipers, etc.

The built-in equipment 2 essentially comprises a reversible AC/DC voltage converter 22, a pack of super-capacitors 23 and a reversible DC/DC converter 24.

The AC/DC converter 22, the pack of super-capacitors 23 and the DC/DC converter 24 are connected to a direct internal bus 28 of the built-in equipment 2.

As can also be seen in FIG. 2, voltage balancing means, represented diagrammatically in the form of a block 25, are also provided in order to balance the charging voltages between the various super-capacitors of the pack 23. The voltage balancing means ensure better reliability of the pack of super-capacitors by balancing the voltage at the terminals of each of the cells of the pack of super-capacitors. These voltage balancing means contribute to improving the service life of the super-capacitor cells by reducing disparities in the charging voltages on the various cells, by limiting these charging voltages to a nominal value and also by preventing any voltage breakdown.

The numeral 29 in FIG. 2 corresponds to a connection for the built-in equipment 2 to a floating direct voltage electrical distribution network.

The numeral 29' in FIG. 2 corresponds to a connection for the built-in equipment 2 to a constant direct voltage electrical distribution network, i.e. typically the 12 V network normally present in current automotive vehicles.

The built-in equipment 2 may be integrated into different regions of the automotive vehicle, even elsewhere than under the bonnet of the vehicle. Thus, integration of the built-in equipment 2 into an automotive vehicle is flexible. This flexibility of integration can reduce the constraints of installation in the vehicle. In a preferred example, the built-in equipment 2 may be placed instead of and in the physical location of the power battery 26. In this case, the battery 26 may be moved to any other suitable location in the vehicle, for example to the boot or beneath the driver's seat. The physical size of the housing 20 containing the built-in equipment 2 may be standardized such that it can be integrated into any type of automotive vehicle.

Figure 4:
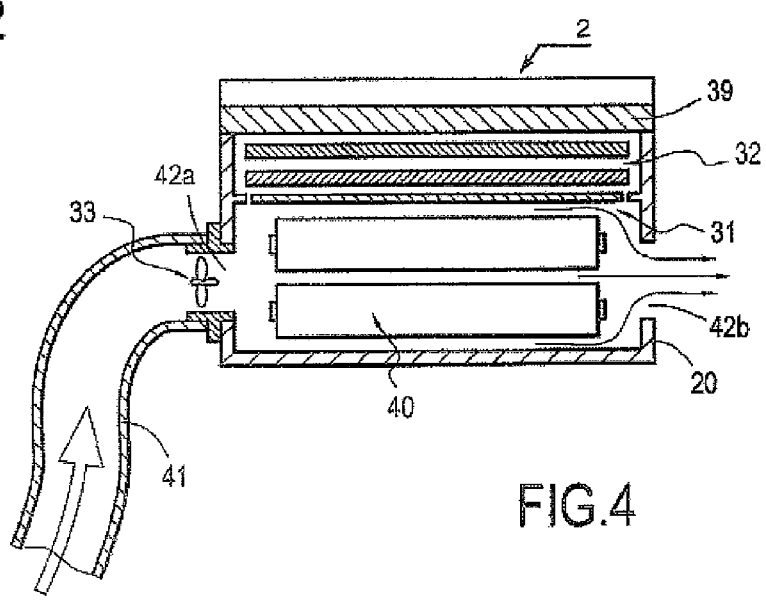
FIG. 4 shows a sectional view of the built-in equipment of the invention.
Figure 3:
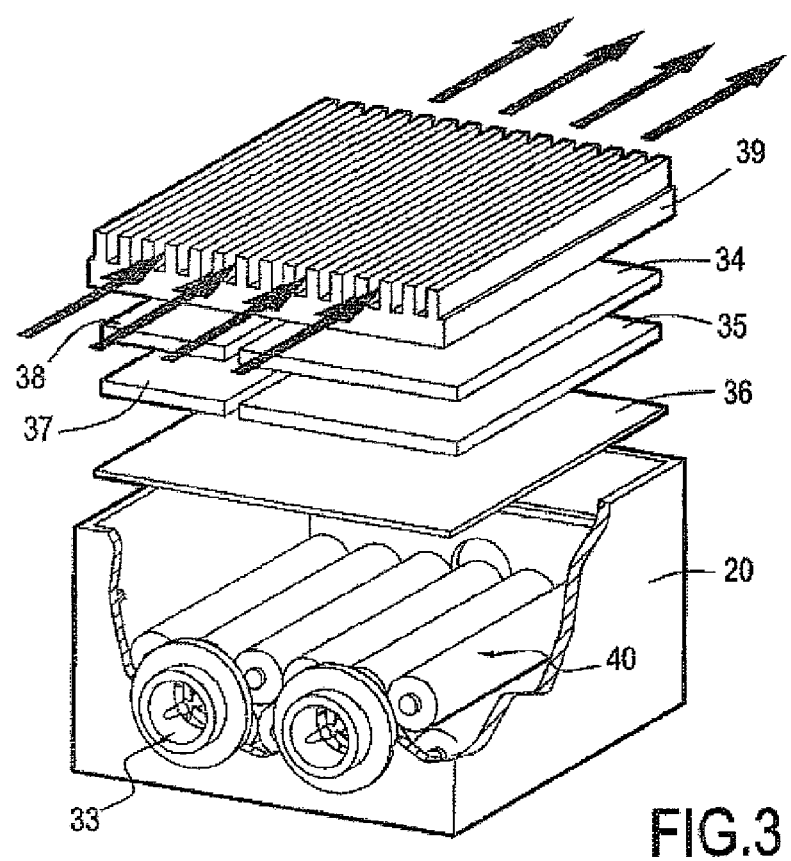
FIG. 3 is an exploded perspective view of the built-in equipment of the invention.
Figure 5:
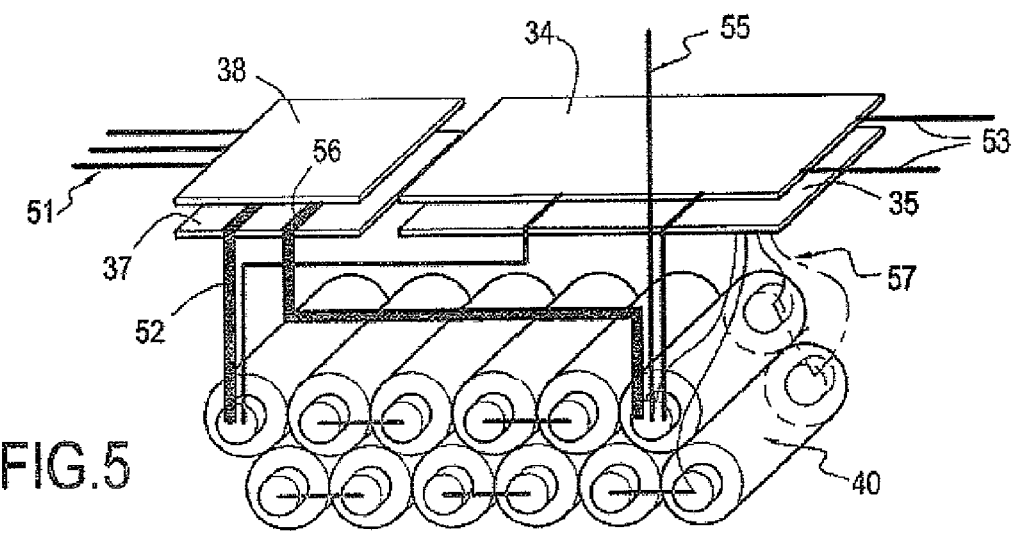
FIG. 5 shows a more detailed perspective view of the built-in equipment of the invention showing the arrangement of the connections.

FIGS. 3 to 5 show in more detail a disposition in the housing 20 of components included in the built-in equipment 2 of the invention.

FIG. 3 shows in a diagrammatic and exploded view the various components housed in the housing 20. In the example of FIG. 3, the housing 20, which is parallelepipedal in shape, is divided into two compartments 31 and 32. Compartment 31 comprises the pack of super-capacitors 23. In a preferred embodiment of the invention, the pack of super-capacitors is in the form of a plurality of super-capacitor cells 40. These cells 40 can store a very large quantity of electrical power over a short period and restore it when starting a vehicle or when the rotary electric machine provides the vehicle with extra torque. In accordance with the invention, the second compartment 32 comprises electronic circuits of the built-in equipment 2. In one particular embodiment, the electronic circuits housed in the compartment 32 are in fact the DC/DC converter 24. In other embodiments of the invention, the electronic circuits also include the AC/DC converter 22 and optionally control circuits or others.

In the embodiment which is more particularly described here, the AC/DC converter 22 and the DC/DC converter 24 are integrated in the compartment 32 of the housing 2 respectively in the form of an electronic power board 38 and an electronic power board 34. The electronic power board for the AC/DC converter 38 is controlled by an electronic control board 37. The electronic power board for the DC/DC converter 34 is controlled by an electronic control board 35. Each of the electronic power boards 34, 38 is preferably juxtaposed. Similarly, the electronic control boards 35, 37 are preferably juxtaposed. The electronic power boards 34, 38 and the electronic control boards 35, 37 are generally mechanically independent in order to minimize development costs. In a variation, the electronic power and control boards of each converter may be produced in the form of a single board.

This mode of dividing the housing 20 into two compartments is a preferred example of the invention.

In a variation, the housing 20 may comprise as many compartments as it has electronic boards. In the above case, each board is placed in a compartment. The various compartments may be stacked on each other as in the described example. In another variation, the compartments may be mounted alongside each other. The components of one compartment must not impinge upon the volume of another compartment. This is in order to allow a change in the design of a compartment without affecting the other compartments.

The compartment 31 comprising the super-capacitor cells 40 and the compartment 32 comprising the electronic boards are separated by a thermally insulating separation wall 36. This separation wall 36 is positioned to ensure that the electronic components on each electronic board are at an optimum operating temperature. The temperature of the cells of the super-capacitor 40 is adjusted to within acceptable limits. Cooling by forced convection can provide this limitation and cool the compartment 31.

As can be seen in FIG. 4, the cooling means for the first compartment 31 are composed of at least two orifices 42a and 42b, which are laterally opposed, and are formed in the housing 20 to circulate a stream of air. These orifices 42a and 42b are relatively large in size so that one of the orifices can receive a fan 33 coupled to a flexible air inlet pipe 41. The number of air inlet and outlet orifices is not limited to two. The first compartment of the housing may have a sufficient number of orifices in order to be capable of rapidly extracting the heat dissipated by the super-capacitor cells 40.

The cooling means may be formed by a heat dissipater 39 placed on the outer upper surface of the second compartment 32 of the housing parallel to the wall 36. The dissipater increases the surface area for heat exchange through the wall of the second compartment 32.

The pack of super-capacitors 23 is arranged so that the stream of air circulates between the various cells of the super-capacitor 40. The built-in equipment 2 comprises at least two sensors (not shown) for measuring temperature. Preferably, one of the temperature sensors is positioned with the electronic power components and the other temperature sensor is positioned with the super-capacitor cells. The temperature measurements mean that the stream of air supplied by the cooling means can be controlled.

FIG. 5 shows the arrangement of the connections inside the housing 20 and between the two compartments 31, 32. In the example of FIG. 5, the electronic boards are mechanically independent of each other.

In one example, the housing may comprise cooling means placed on the electronic power boards, which are those dissipating the most heat. These cooling means may be fans connected to each electronic power board 34, 38 or a heat dissipater or a heat exchanger using a heat transfer fluid.

The cells of the super-capacitor are disposed horizontally in an aligned manner with alternating negative or positive polarity. The cells of the super-capacitor 40 are connected in series.

The voltage balancing means integrated into the equipment 2 will now be described with reference to FIGS. 6A and 6B.

Figure 6A:
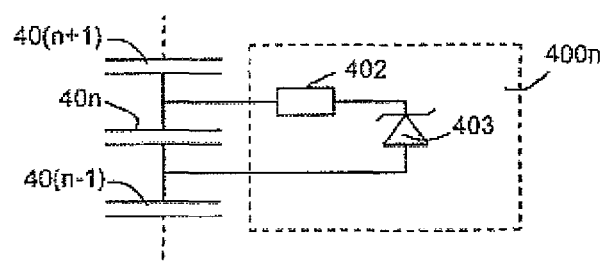
FIGS. 6A and 6B show schematic diagrams of two embodiments of the voltage balancing means included in the built-in equipment of the invention.
Figure 6B:
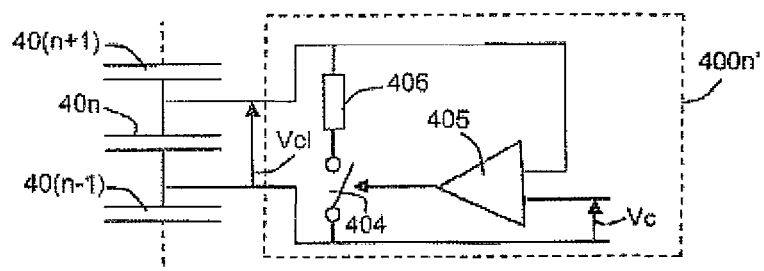

Two implementations are respectively shown in FIGS. 6A and 6B in the form of voltage balancing cells $400n$ and $400n'$. In any one same embodiment, the voltage balancing means comprise a plurality of analogous voltage balancing cells, each voltage balancing cell being electrically connected to the terminals of a respective super-capacitor cell.

As can be seen in FIG. 6A, a cell $400n$ essentially comprises, in this first embodiment, a resistance 402 and a Zener diode 403. The resistance 402 and the diode 403 are connected in series in order to form a limiting circuit or voltage clipper which is connected in parallel to the terminals of the respective super-capacitor cell $40n$. The Zener diode 403 and the resistance 402 are selected so as to limit the voltage at the terminals of the cell $40n$ to a predetermined maximum value.

As can be seen in FIG. 6B, a cell $400n'$ essentially comprises, in this second embodiment, a switch 404 and a voltage comparator 405. The switch 404 is, for example, formed by a MOS-FET type transistor and is connected, in series with a current limiting resistance 406, to the terminals of the super-capacitor cell 40n. The comparator 405 compares the voltage Vc1 at the terminals of the super-capacitor cell 40n with a reference voltage Vc. When the voltage Vc1 becomes larger than the reference voltage Vc, the comparator 405 orders the switch 404 to close to limit the voltage Vc1 to a maximum value equal to Vc.

In one particular embodiment, the voltage balancing cells 400n, 400n' can be placed on one of the electronic control boards 35, 37. In this case the voltage balancing cells 400n, 400n' are connected to the super-capacitor cells 40 via connecting wires 57 shown in FIG. 5. In certain embodiments of the invention, such as form 400n, for example, the voltage balancing cells can be placed directly at the terminals of the super-capacitor cells 40.

The two examples given above for the voltage balancing means have been represented and described in a simplified manner principally as regards the function of voltage limitation carried out by these means. Clearly, different variations of the embodiments are possible and lie within the scope of the skilled person.

The electronic power board 38 of the AC/DC converter is connected to the reversible rotary electric machine 21 via a three-phase connection 51. The electronic power board 34 of the DC/DC converter is connected to the power battery of the electrical distribution network of the vehicle via a connection 53.

The electronic power board 38 of the AC/DC converter is connected to a negative terminal 52 of the pack of super-capacitors 23 and to a positive terminal 56 of the pack of super-capacitors 23. The electronic power board 34 of the DC/DC converter is connected to the negative terminal 52 of the pack of super-capacitors 23 and to the positive terminal 56 of the pack of super-capacitors 23.

These four connections of the electronic boards 34 and 38 to the pack of super-capacitors 23 are produced using short wiring which considerably reduces the phenomenon of thermal avalanche when the machine 21 is in motor mode and the voltage ripples when the machine 21 is in generator mode.

Connection of the electronic power board of the AC/DC converter 38 to the negative terminal 52 can also avoid mass shift. Mass shift is observed when there is no common mass between the various electronic components and the voltage regulation of the electrical system of the vehicle passes via different voltage measurements at the terminals of the various electric devices, of which the invention forms part, which constitute said system. Mass shift causes communication problems between the various organs of the system and poor regulation. The fact that there is a common mass in the device of the invention means that certain standard tests concerning the electrical connections between the various blocks of the engine compartment can be dispensed with, thereby making the design more effective.

The invention is of particularly advantageous application in combination with the dual voltage network system known as 14+X. This architecture has two independent electrical networks one of which, the 14+X network, is capable of operating at a high floating voltage because of its technology. This arrangement of the housing as shown in FIG. 5 shows a connection 55 from the positive terminal 56 of the pack of super-capacitors 23 to the network comprising loads which can operate with a floating network (de-icer, windscreen wipers etc).

The invention claimed is:

1. A built-in equipment for a micro-hybrid device for an automotive vehicle, said built-in equipment electrically connectable to operative components (21, 26) of said micro-hybrid device, said built-in equipment comprising:
   a pack of super-capacitors (23, 40) provided with voltage balancing means (25, 400n, 400n') and electronic circuits (22, 24, 34, 35, 37, 38); and
   a housing (20) divided into a first compartment (31) and a second compartment (32) by a separation wall;
   said first compartment (31) housing said pack of super-capacitors (23, 40);
   said second compartment housing said electronic circuits (22, 24, 34, 35, 37, 38) and said voltage balancing means (25, 400n, 400n').

2. Equipment according to claim 1, wherein said pack of super-capacitors (23, 40) comprises a plurality of super-capacitor cells (40) and said voltage balancing means (25, 400n, 400n') comprise a plurality of voltage balancing cells (400n, 400n') connected to the terminals of said plurality of super-capacitor cells (40).

3. Equipment according to claim 2, wherein said voltage balancing cells (400n, 400n') each comprise voltage limiting means (402, 403, 404, 405, 406) mounted to limit a charging voltage (Vc1) for the super-capacitor cell (40) to a predetermined value (Vc).

4. Equipment according to claim 3, wherein said voltage limiting means (402, 403, 404, 405, 406) are connected to the terminals of the respective super-capacitor cell (40).

5. Equipment according to claim 2, wherein said cells of the super-capacitor (40) are electrically mounted in series.

6. Equipment according to claim 2, wherein the cells of the super-capacitor (40) are elongate cells disposed parallel to each other.

7. Equipment according to claim 2, wherein the cells (40) are orientated alternately in one direction then in the other to present opposite poles to one face of the housing.

8. Equipment according to claim 2, wherein the cells (40) are elongate with their largest dimension orientated parallel to the plane of a wall (36) separating said first and second compartments (31, 32) in the housing.

9. The built-in equipment according to claim 1, wherein said electronic circuits comprise a reversible DC/DC converter (24) which can be connected to an electric power battery (26) of an electrical distribution network of said automotive vehicle.

10. The built-in equipment according to claim 9, wherein said electronic circuits comprise an electronic board (35) for controlling the DC/DC converter (24).

11. The built-in equipment according to claim 1, wherein said electronic circuits comprise an AC/DC converter (22) connectable to a rotary electric machine (21) of said micro-hybrid device.

12. The built-in equipment according to claim 11, wherein said electronic circuits comprise an electronic board (37) for controlling the AC/DC converter (22).

13. Equipment according to claim 1, wherein the first compartment (31) and the second compartment (32) are separated by a thermally insulating wall (36).

14. Equipment according to claim 1, further comprising cooling means (33, 39) for one and/or the other of said first and second compartments (31, 32) of the housing.

15. Equipment according to claim 14, wherein the cooling means comprise at least one fan (33) coupled to a pipe (41) ensuring forced circulation of a cooling fluid through the first compartment (31).

16. Equipment according to claim 14, wherein the cooling means comprise a heat dissipater (39) increasing the surface area for heat exchange through the outer wall of the second compartment of the housing (20).

17. A micro-hybrid device for an automotive vehicle comprising a rotary electric machine (21) mechanically coupled to a heat engine of said vehicle and built-in equipment, said built-in equipment being electrically connectable, on the one hand, to said rotary electric machine (21) and, on the other hand, to an electric power battery of said vehicle; said built-in equipment comprising:
- a pack of super-capacitors (23, 40) provided with voltage balancing means (25, 400$n$, 400$n'$) and electronic circuits (22, 24, 34, 35, 37, 38); and
- a housing (20) divided into a first compartment (31) and a second compartment (32) by a separation wall;
- said first compartment (31) housing said pack of super-capacitors (23, 40);
- said second compartment housing said electronic circuits (22, 24, 34, 35, 37, 38) and said voltage balancing means (25, 400$n$, 400$n'$).

18. The micro-hybrid device according to claim 17, wherein the rotary electric machine (21) is a starter-alternator.

19. An automotive vehicle comprising a micro-hybrid device; said micro-hybrid device for an automotive vehicle comprising a rotary electric machine (21) mechanically coupled to a heat engine of said vehicle and built-in equipment, said built-in equipment being electrically connectable, on the one hand, to said rotary electric machine (21) and, on the other hand, to an electric power battery of said vehicle; said built-in equipment comprising:
- a pack of super-capacitors (23, 40) provided with voltage balancing means (25, 400$n$, 400$n'$) and electronic circuits (22, 24, 34, 35, 37, 38); and
- a housing (20) divided into a first compartment (31) and a second compartment (32) by a separation wall;
- said first compartment (31) housing said pack of super-capacitors (23, 40);
- said second compartment housing said electronic circuits (22, 24, 34, 35, 37, 38) and said voltage balancing means (25, 400$n$, 400$n'$).

* * * * *